United States Patent
Ogawa (10) Patent No.: US 10,335,964 B2
(45) Date of Patent: Jul. 2, 2019

(54) METHOD AND SYSTEM FOR CONTROLLING ROBOT

(71) Applicant: DENSO WAVE INCORPORATED, Chita-gun, Aichi-pref. (JP)

(72) Inventor: Akira Ogawa, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 118 days.

(21) Appl. No.: 15/335,863

(22) Filed: Oct. 27, 2016

(65) Prior Publication Data

US 2017/0157783 A1 Jun. 8, 2017

(30) Foreign Application Priority Data

Oct. 28, 2015 (JP) ................... 2015-211826

(51) Int. Cl.
| | |
|---|---|
| G06F 19/00 | (2018.01) |
| B25J 19/06 | (2006.01) |
| B25J 19/02 | (2006.01) |
| F16P 3/00 | (2006.01) |
| F16P 3/14 | (2006.01) |
| G05B 19/048 | (2006.01) |
| G05B 19/4061 | (2006.01) |

(Continued)

(52) U.S. Cl.
CPC ............ *B25J 19/06* (2013.01); *B25J 9/1676* (2013.01); *B25J 19/022* (2013.01); *F16P 3/003* (2013.01); *F16P 3/14* (2013.01); *F16P 3/144* (2013.01); *F16P 3/147* (2013.01); *G05B 19/048* (2013.01); *G05B 19/4061* (2013.01); *G08B 21/02* (2013.01); *G05B 2219/40202* (2013.01); *G05B 2219/40264* (2013.01)

(58) Field of Classification Search
CPC ........ B25J 19/06; B25J 9/1676; B25J 19/022; F16P 3/003; F16P 3/14; F16P 3/144; F16P 3/147; G05B 19/048; G05B 19/4061; G05B 2219/40202; G05B 2219/40264; G08B 21/02
USPC ................................. 700/245, 255
See application file for complete search history.

(56) References Cited

U.S. PATENT DOCUMENTS

| | | | | |
|---|---|---|---|---|
| 8,369,993 B2 * | 2/2013 | Kagawa | ................ | B25J 9/1692 700/263 |
| 8,406,923 B2 * | 3/2013 | Ueyama | ................ | B25J 9/1697 700/245 |

(Continued)

FOREIGN PATENT DOCUMENTS

JP  2010-231713 A  10/2010

*Primary Examiner* — Ronnie M Mancho
(74) *Attorney, Agent, or Firm* — Oliff PLC (57) ABSTRACT

In a robot control system, the distance from an operating region of a robot arm to a person who is approaching the region is measured using a laser sensor. Information necessary to acquire a safety skill level that is stored in an RFID tag possessed by the person is acquired using an RFID reader. A controller classifies distances into a short distance, which is a distance within the operating region of the arm, a long distance, which is a distance that exceeds a movable region of the arm, and an intermediate distance, which is a distance between the short distance and the long distance. The motion of the arm is controlled by the controller, depending on the distance (i.e., the long distance, the intermediate distance, or the short distance) and the safety level.

9 Claims, 10 Drawing Sheets

(51) Int. Cl.
  *G08B 21/02* (2006.01)
  *B25J 9/16* (2006.01)

(56) References Cited

U.S. PATENT DOCUMENTS

| | | | |
|---|---|---|---|
| 8,918,210 B2* | 12/2014 | Kagawa | B25J 9/1692 |
| | | | 318/568.11 |
| 9,418,394 B2* | 8/2016 | Atohira | G06T 1/00 |
| 9,660,444 B2* | 5/2017 | Kanada | H02J 1/10 |
| 9,984,354 B1* | 5/2018 | Chinoy | G06Q 10/087 |
| 2006/0111813 A1* | 5/2006 | Nishiyama | G05B 19/41815 |
| | | | 700/253 |
| 2007/0118249 A1* | 5/2007 | Nagamatsu | B25J 9/1666 |
| | | | 700/248 |
| 2008/0249659 A1* | 10/2008 | Ueyama | B25J 9/0018 |
| | | | 700/245 |
| 2014/0297030 A1* | 10/2014 | Iwasaki | G05B 19/416 |
| | | | 700/245 |

\* cited by examiner

|  | SHORT DISTANCE (WITHIN ORERATING REGION OF ROBOT) | INTERMEDIATE DISTANCE (WITHIN MOVABLE REGION OF ROBOT) | LONG DISTANCE (BEYOND MOVABLE REGION OF ROBOT) |
|---|---|---|---|
| NO TAG | STOP | STOP | HIGH SPEED |
| BEGINEER HAVING TAG | STOP | LOW SPEED | HIGH SPEED |
| EXPERT HAVING TAG | STOP | HIGH SPEED | HIGH SPEED |

FIG.6

METHOD AND SYSTEM FOR CONTROLLING ROBOT

CROSS-REFERENCE TO RELATED APPLICATION

This application is based on and claims the benefit of priority from earlier Japanese Patent Application No. 2015-211826 filed on Oct. 28, 2015, the description of which is incorporated herein by reference.

BACKGROUND

Technical Field

The present invention relates to a method and system for controlling a robot, and more particularly, to a method and system for controlling the motion of an arm of an industrial robot.

Related Art

In conventional facilities in which robots and people coexist, when a robot controller detects that a person has approached a robot arm using, for example, a light curtain or a laser sensor, control is performed such that the operation of the robot arm is paused or the robot arm is operated at a safe low speed.

RELATED ART DOCUMENT

Patent Document

[Patent Document 1] JP-A 2010-231713

In the above case, however, the operation of the robot arm is paused or the speed of operation of the robot arm is reduced every time the person approaches the robot arm, whereby work efficiency is greatly reduced.

SUMMARY

It is thus desired to provide a method and system for controlling a robot that are capable of securing the safety of a person when the person approaches the robot and of minimizing the reduction of work efficiency.

In a robot control system (apparatus) according to an exemplary embodiment, a distance measuring unit measures the distance from an operating region of a robot main body to a person who is approaching the region. An information acquisition unit acquires, by a wirelessly transmitted signal, information necessary to acquire a safety skill level, which is stored in a recording medium possessed by the person;

A control device classifies distances into a short distance, which is a distance within the operating region of the robot main body, a long distance, which is a distance that exceeds a movable region of the robot main body, and an intermediate distance, which is a distance between the short distance and the long distance. In the case in which the distance belongs to the long distance, the control device operates the robot main body without deceleration. In the case in which the distance belongs to the short distance, the control device stops the operation of the robot main body. In the case in which the distance belongs to the intermediate distance and the safety skill level indicates an expert, the control device operates the robot main body without deceleration. In addition, in the case in which the distance belongs to the intermediate distance and the safety skill level indicates a beginner, the control device operates the robot main body in a decelerated state such that the person can take action to ensure his/her own safety. Furthermore, in the case in which the distance belongs to the intermediate distance and the safety skill level cannot be acquired, the control device stops the operation of the robot main body.

That is, in the case in which the person is detected within the range of the intermediate distance, the operation of the robot main body is paused, the robot main body is operated without deceleration, or the robot main body is operated in a decelerated state depending on whether or not it is possible to acquire the safety skill level of the person or depending on the degree of the acquired safety skill level. Consequently, it is possible both to ensure the safety of the person who is present within the range of the intermediate distance and to prevent the operation of the robot main body from being paused or the robot main body from being operated at a low speed in the same way, thereby minimizing the reduction of work efficiency.

This effect is similar even in a method of controlling a robot according to another example described above.

In a preferred example of the system, the distance measuring unit is configured to acquire a person position coordinate value, which is a position of the person to whom the distance is measured, and the information acquisition unit is also configured to acquire a medium position coordinate value, which is a position of the recording medium. In the case in which a plurality of person position coordinate values is acquired within a range of the intermediate distance, the control device determines whether or not a plurality of medium position coordinate values corresponding to the person position coordinate values is acquired. In the case in which the medium position coordinate values corresponding to the person position coordinate values are acquired and any one of the safety skill levels corresponding to the medium position coordinate values indicates a beginner, the control device operates the robot main body in the decelerated state. On the other hand, in the case in which no medium position coordinate values corresponding to the person position coordinate values are acquired, the control device stops the operation of the robot main body.

That is, even in the case in which the distance measuring unit and the information acquisition unit are configured to acquire the person position coordinate value and the medium position coordinate value, respectively, the acquisition principle differs depending on the method. For example, in the state in which a plurality of people is present, the case in which only the coordinate value of the person who is close to the robot can be acquired is also assumed. In addition, if the person does not possess the recording medium, the medium position coordinate value corresponding to the person is not acquired even though the person position coordinate value can be acquired.

In the case in which a plurality of people are present within the range of the intermediate distance, if the medium position coordinate value corresponding to each person is acquired and any one of the safety skill levels thereof indicates a beginner, who has a low level, the robot main body is operated in a decelerated state. On the other hand, if a medium position coordinate value is not acquired for every person, which means that there is a person who does not possess a recording medium, the operation of the robot main body is paused. It is possible to ensure safety if the operation state of the robot main body is determined even when a plurality of people is present within the range of the intermediate distance.

In another preferred example of the system, the distance measuring unit is constituted by a laser sensor. When a plurality of person position coordinate values is acquired in a plurality of directions within the range of the intermediate distance, the control device regards the person position coordinate values present in the respective directions as person position coordinate groups. In the case in which a medium position coordinate value that does not correspond to the acquired person position coordinate value of at least one of the person position coordinate groups is acquired on an extension line thereof, the control device determines whether or not the safety skill level of only the acquired person position coordinate value is acquired and whether the safety skill level of the acquired person position coordinate value is high or low and evaluates the safety skill level of the person position coordinate group. Here, "evaluation" is evaluation including a person whose safety skill level cannot be acquired. The person whose safety skill level cannot be acquired is evaluated as a person who has a lower safety skill level than a beginner. The control device finally evaluates one of the person position coordinate groups that has the lowest safety skill level.

That is, in the case in which a plurality of people is present within the range of the intermediate distance, a plurality of person position coordinate values is acquired in a plurality of directions using the laser sensor. Consequently, the person position coordinate values are referred to as "person position coordinate groups." In addition, in the case in which the laser sensor is used, when a plurality of people is present such that they overlap each other in the direction in which the laser light is radiated in the person position coordinate groups, it is possible to acquire the position coordinate value of the person who is present at a position close to the laser sensor. However, if the laser light is radiated to a person who is present at a position distant from the person who is present at a position close to the laser sensor, the person position coordinate value may not be detected.

In the latter case, however, the medium position coordinate value may be acquired. Thereupon, a medium position coordinate value that does not correspond to the acquired person position coordinate value may be acquired on an extension line thereof, as described above. In this state, the person who is closer to the robot main body is in greater danger. Consequently, it may be determined whether or not the safety skill levels of the acquired person position coordinate values of the respective person position coordinate groups are acquired and whether the safety skill levels of the acquired person position coordinate values are high or low. If the operation state of the robot main body is determined by finally evaluating one of the groups having the lowest safety skill level, it is possible to ensure safety through efficient processing.

In a further preferred system, the control device defines a region in which the robot main body is to operate within a predetermined time from the present time as a monitoring region and defines a region in which the robot arm is not to operate within the predetermined time from the present time as an unmonitored region. In the case in which the measured distance belongs to the intermediate distance and to the unmonitored region, the robot main body is operated without deceleration, since safety is ensured even when a person is present within the range of the intermediate distance. Consequently, it is possible to further improve work efficiency.

In another further preferred system, the control device operates the robot main body without deceleration even in the case in which the measured distance belongs to the short distance and to the unmonitored region. That is, in the case in which the measured distance belongs to the unmonitored region, the robot body is operated without deceleration, since safety is ensured even when a person is present within the range of the short distance in the same manner as above. Consequently, it is possible to even further improve work efficiency.

DETAILED DESCRIPTION OF THE PREFERRED EMBODIMENTS

Hereinafter, various embodiments of a method and system for controlling the operation of an arm of a robot according to the present invention will be described with reference to the accompanying drawings. The robot may be an industrial robot installed in a facility such as a manufacturing plant.

First Embodiment

Hereinafter, a first embodiment will be described with reference to FIGS. 1 to 8.

Figure 1:
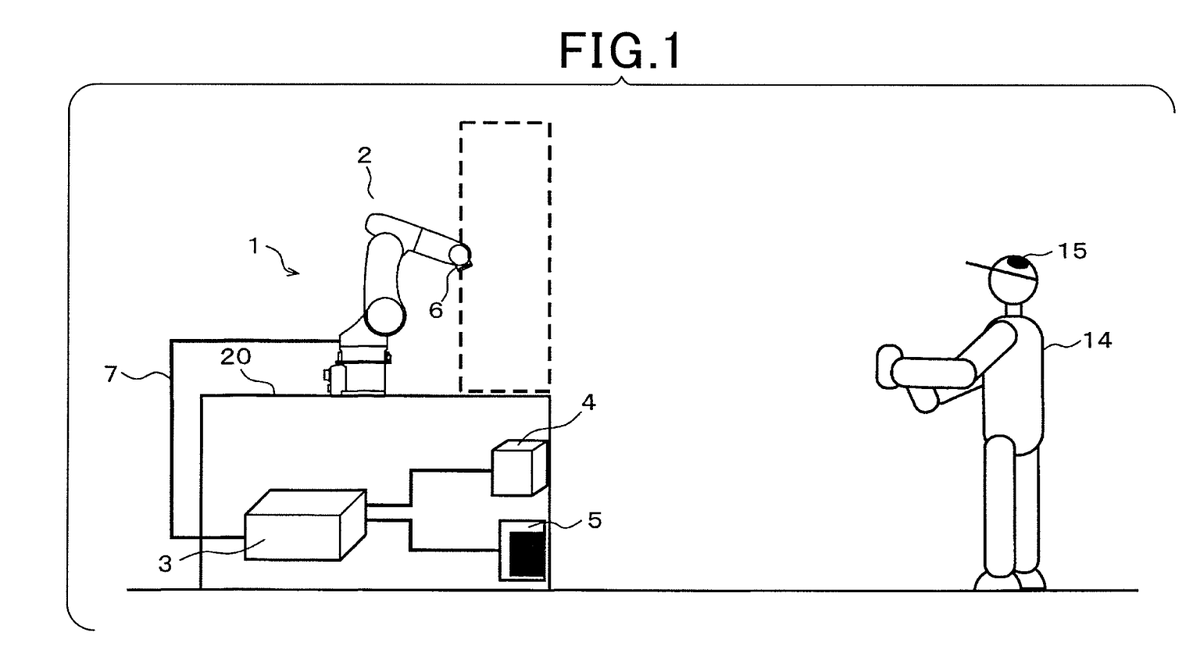
FIG. 1 is a view schematically showing the external appearance of a robot control system according to a first embodiment.
Figure 2:
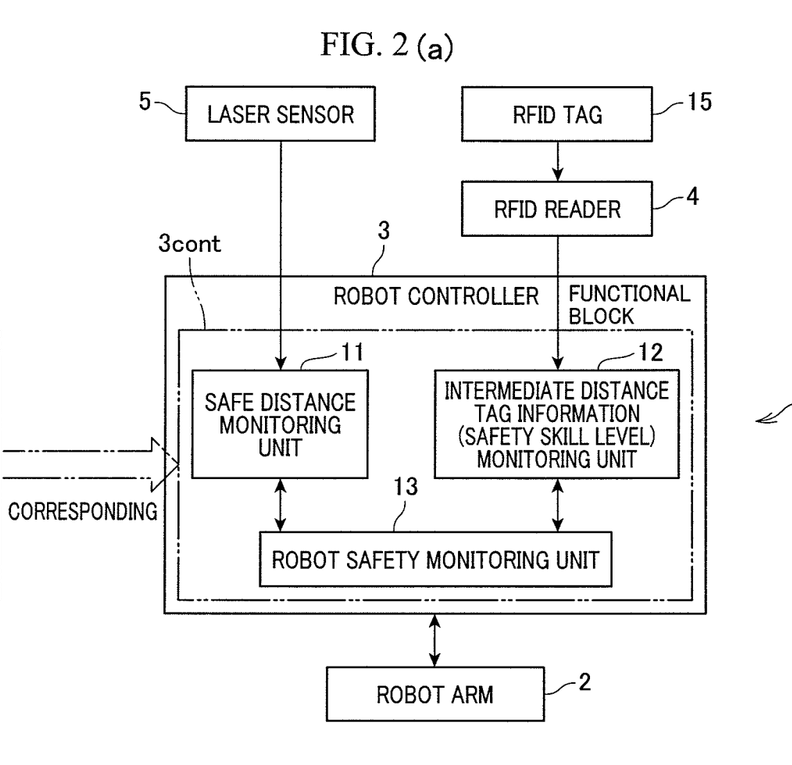
FIG. 2(a) is a functional block diagram showing the internal construction of the robot controller and FIG. 2(b) is a hardware block diagram exemplarily showing the internal construction of the robot controller.

FIG. 1 is a view schematically showing the external appearance of a robot control system (apparatus) 1 according to this embodiment. The system 1 is an industrial robot. For example, the system 1 includes a robot arm 2 for assembly, a robot controller 3 for controlling the robot arm 2, and an RFID reader 4 and a laser sensor 5 connected to the robot controller 3.

The robot arm 2, which is a robot main body, is configured as, for example, a 6-axis vertical multi-joint robot. The robot arm 2 is installed on a working stand 20. A detailed description of the general construction of the robot arm 2 will be omitted. The robot arm 2 has six-axis arms, each of which is driven by a servo motor. A hand 6 for holding, for example, a workpiece received in a pallet is provided at the tip of the sixth axis arm. The robot arm 2 is connected to the robot controller 3 via a connection cable 7. The respective servo motors are controlled by the robot controller 3.

The robot controller 3, which corresponds to a control device, includes a control circuit 3cont, a servo control unit (not shown), and a power supply device (not shown), which are received in a frame, which is formed in the shape of a rectangular box. As one example, as will be described later, the control circuit 3cont mainly includes a microcomputer. The control circuit 3cont controls the respective servo motors of the robot arm 2 in accordance with an operating program, which is previously stored, teaching data set by teaching pendant, which is not shown, or various parameters such that the workpiece assembly operation is automatically performed by the robot arm 2.

Figure 3:
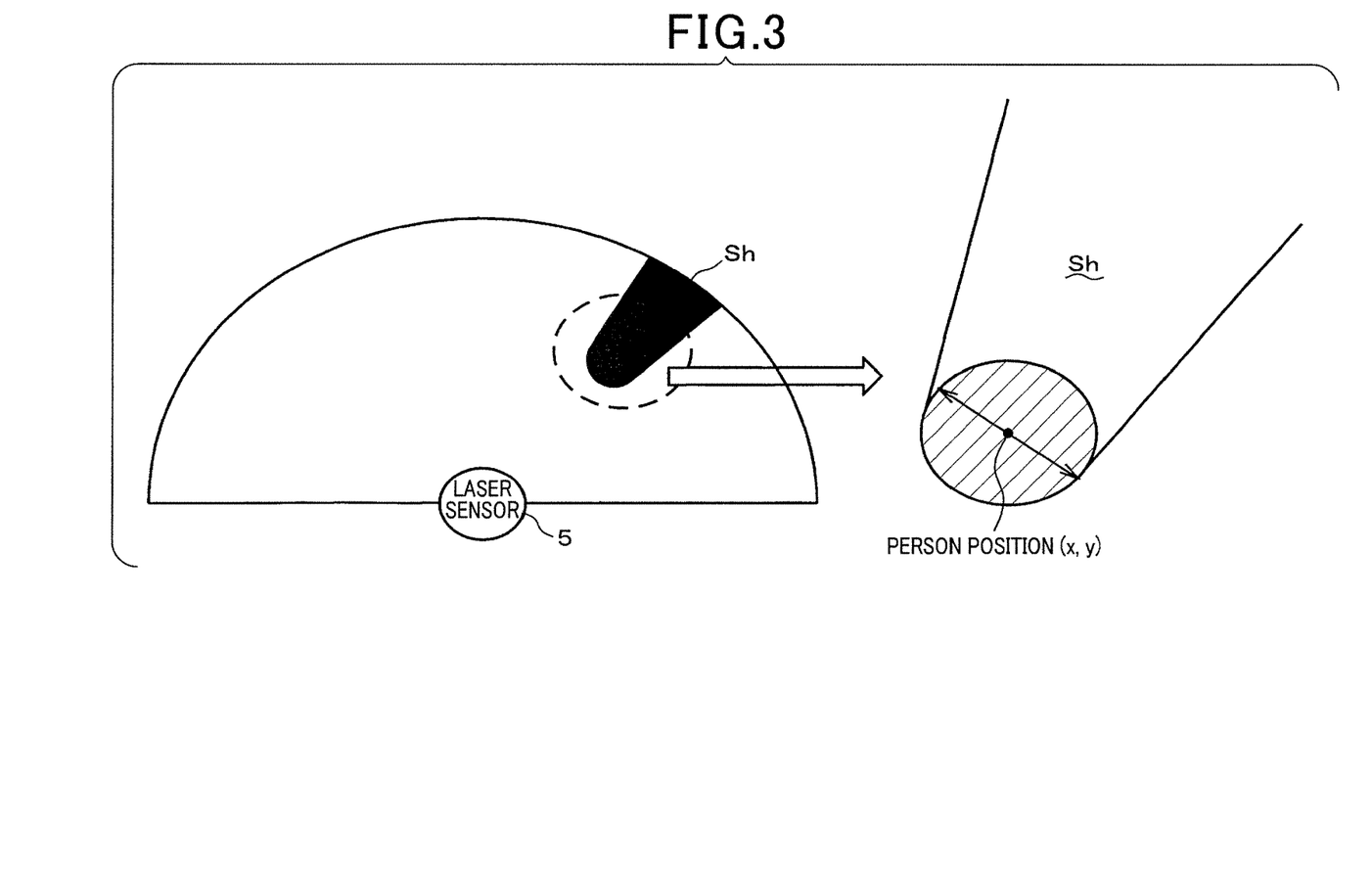
FIG. 3 is a view illustrating a principle of determining a person position coordinate value using a laser sensor.

The laser sensor 5, which corresponds to a distance measuring unit, measures the distance and direction from the outer edge of the operating region of the robot arm 2 to a person 14 who is approaching the region by scanning laser light. A two-dimensional coordinate value (x, y) is obtained from the measuring result. As shown in FIG. 3, when laser light is radiated to the person 14, a shadow Sh is formed at a portion including the person 14 and at the rear thereof. In a position in which the external shape of the shadow Sh is changed from an arc to a straight line, a distance of about 60 cm, which is the width of a human body, is detected. The position of the center of the width of 60 cm is regarded as the coordinate value (x, y).

The RFID reader 4, which corresponds to an information acquisition unit, reads information about a safety skill level of the person 14, which is stored in an RFID tag 15 attached to, for example, a cap of the person 14, using a radio signal, which is a wirelessly transmitted signal. The RFID tag 15 corresponds to a recording medium.

In addition, the RFID reader 4 is also capable of detecting a direction of or a distance to the RFID tag 15, from which the RFID reader 4 has acquired the information stored in the RFID tag 15. The direction is detected as follows. A radio signal transmitted from the RFID tag 15 is received using a rotating antenna in the state in which a Doppler shift is generated, the difference in received waveforms is generated by the direction of the RFID tag 15, and pattern matching with the received waveform model of each angle, which is stored in advance, is performed. The direction indicated by the most similar received waveform model is specified as the direction of the RFID tag 15.

In addition, the distance between the RFID reader 4 and the RFID tag 15 is calculated based on the intensity of the radio waves, for example, as follows, since the distance is proportional to the intensity of the radio waves.

Distance value=intensity of radio wave×k (k indicates a fixed value that is specified in advance through experiments)

When the direction and the distance are calculated, it is possible to obtain the coordinates of the position spaced apart from the position (x=0, y=0) of the RFID reader 4 by a distance value at the angle of the calculated direction as a tag position (x, y). The details thereof are disclosed in Japanese Patent Application Publication No. 2015-34808.

Hereinafter, the position coordinates of the person 14, which are measured using the laser sensor 5, will be referred to as a person position (x, y) that corresponds to a person position coordinate value, and the position coordinates of the RFID tag 15, which are measured using the RFID reader 4, will be referred to as a tag position (x, y), which corresponds to a medium position coordinate value.

As shown in FIG. 2(a), which is a functional block diagram, the robot controller 3 functionally includes a safe distance monitoring unit 11, an intermediate distance tag information monitoring unit 12, and a robot safety monitoring unit 13. These elements are functions that are realized by software of the control circuit 3cont. As shown in FIG. 2(b), which is a hardware block diagram, one example of the control circuit 3cont includes an input/output interface 3A for transmitting and receiving a signal to and from the outside, a CPU (central processing unit) 3B connected to the input/output interface 3A via a bus, a ROM (read only memory) 3C, an RAM (random access memory) 3D, and a timer 3E. Upon startup, the CPU 3B reads a control program that is previously stored in the ROM 3C to the work area thereof, and sequentially executes the program. For this reason, the ROM 3C functions as a non-transitory computer readable recording medium. The RAM 3D is used for the CPU 3B to temporarily store data during processing of the program. The timer 3E is used to measure time. In this embodiment, the safe distance monitoring unit 11, the intermediate distance tag information monitoring unit 12, and the robot safety monitoring unit 13 are functionally constituted according to the processing of the CPU 3B (i.e. the control circuit 3cont, i.e. the robot controller 3). Of course, the control circuit 3cont may be constituted by combining a digital circuit, such as a logical circuit, and a memory device, without using the CPU.

Hereinafter, the processing of the control circuit 3cont will be described with reference to the functional block diagram shown in FIG. 2(a).

The safe distance monitoring unit 11 determines whether the distance to the person 14 measured by the laser sensor 5 belongs to a long distance, an intermediate distance, or a short distance, and input the determination result to the robot safety monitoring unit 13. The safe distance monitoring unit 11 also corresponds to a distance measuring unit.

Here, the long distance, the intermediate distance, and the short distance are defined as follows.

Short distance=Distance within operating region of robot arm 2

Long distance=Distance that exceeds movable region of robot arm 2

Intermediate distance=Distance greater than short distance and less than long distance Although division into these distances based on specific values may change depending on the facility, the threshold value that distinguished the short distance and the intermediate distance from each other is, for example, about several hundreds of mm, and the threshold value by which the intermediate distance and the long distance are distinguished from each other is, for example, about 1 to 2 m. Furthermore, the region indicated by a broken line in FIG. 1 indicates a region in which both the robot arm 2 and the person work, i.e. an image of the "short distance."

The intermediate distance tag information monitoring unit 12 discriminates information about the safety skill level of the person 14, which the RFID reader 4 has read from the RFID tag 15, and inputs the discrimination result to the robot safety monitoring unit 13. The intermediate distance tag information monitoring unit 12 also corresponds to an information acquisition unit. The information about the safety skill level of the person 14 is set in response to, for example, the work experience of the person 14 and the degree of work skill. For example, a person who has a long operating experience period and a high degree of skill is considered to have a high safety skill level and thus is set to an "expert." A person who has a short operating experience period and a low degree of skill is considered to have a low safety skill level and thus is set to a "beginner". The robot safety monitoring unit 13 controls the operating speed of the robot arm 2 based on the discrimination results received from the safe distance monitoring unit 11 and the intermediate distance tag information monitoring unit 12 in consideration of safety.

Figure 4:
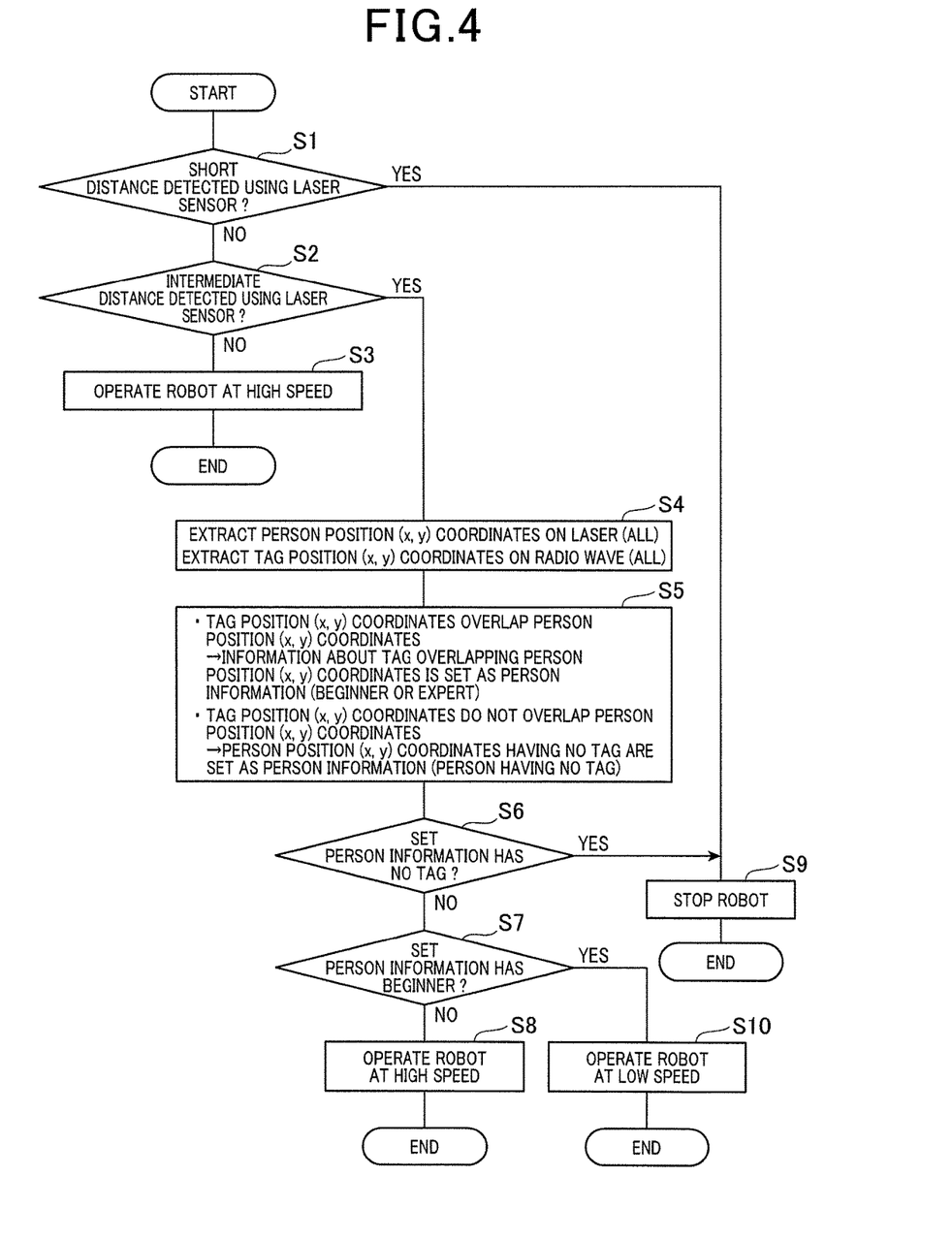
FIG. 4 is a flowchart showing control based on a robot safety monitoring unit of the robot controller.

Next, the operation of this embodiment will be described with reference to FIGS. 4 to 8. FIG. 4 is a flowchart showing control based on the robot safety monitoring unit 13 of the robot controller 3 (i.e. the control circuit 3cont). This flowchart is executed at each sampling period and control period of the robot controller 3. First, the robot safety monitoring unit 13 acquires distance information of the person 14 through the safe distance monitoring unit 11. Then, the robot safety monitoring unit 13 determines whether or not the person 14 is present within the range of the short distance and the intermediate distance (S1 and S2).

In the case in which the person 14 is not present within the range of the short distance and the intermediate distance (NO of S2), it means that the person 14 is present at least within the range of the long distance. In this case, the robot arm 2 is operated at a high speed since the person 14 is present at a distance that is safe from the robot arm 2 (S3). Here, the "high speed" is an operating speed of the robot arm 2 that is prescribed in the control program, for example several m/s. On the other hand, in the case in which the person 14 is present within the range of the short distance (YES of S1), the operation of the robot arm 2 is paused in order to ensure the safety of the person 14 (S9).

Figure 7:
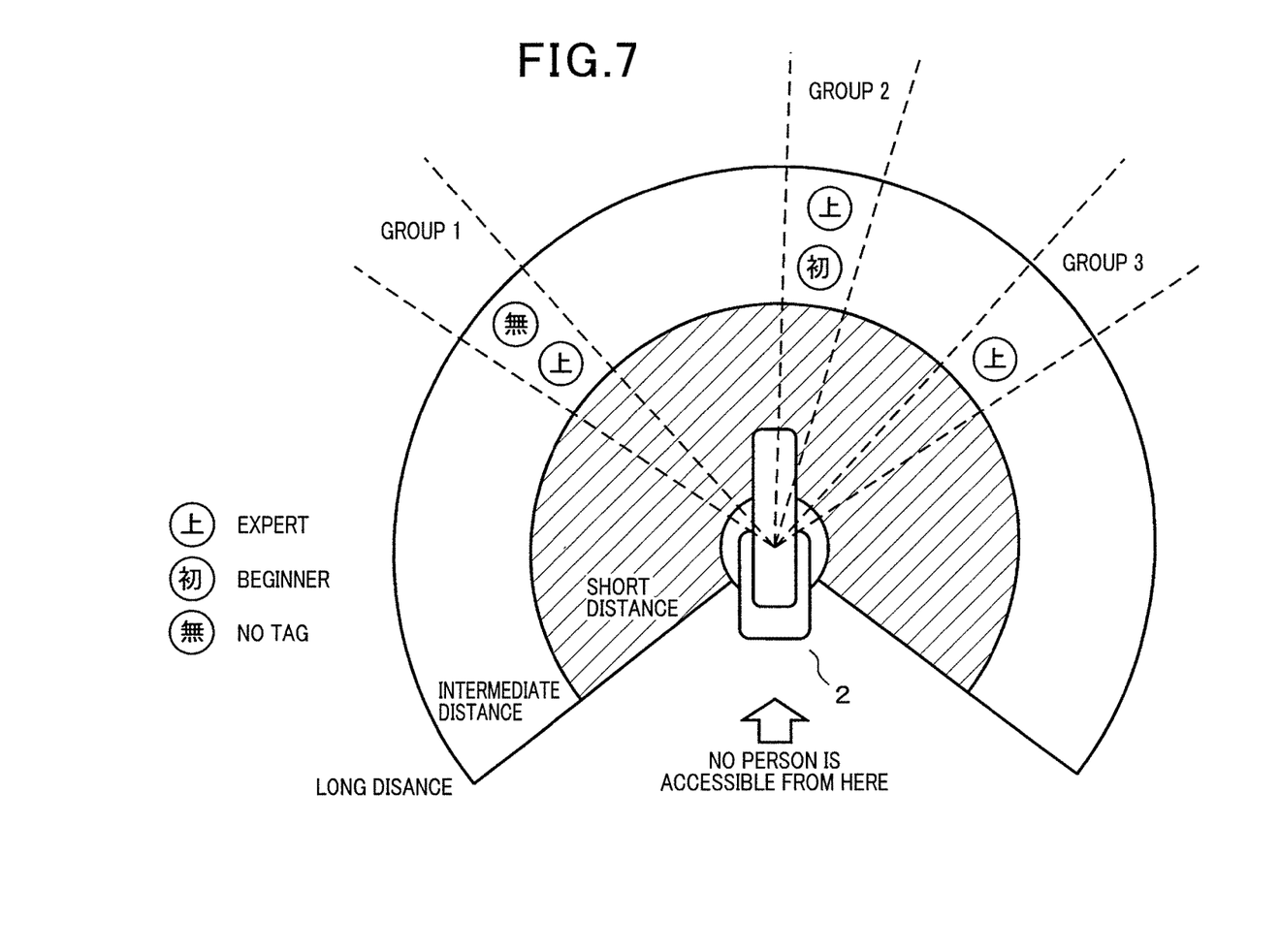
FIG. 7 is a view showing an example of the case in which a plurality of people is present within a range of the intermediate distance (part 1)

In addition, in the case in which the person 14 is present within the range of the intermediate distance (YES of S2), the person position (x, y) acquired using the laser sensor 5 at the current time and the tag position (x, y) acquired using the RFID reader 4 are extracted (S4). Subsequently, at step S5, a recognition process is performed as follows. For example, a state shown in FIG. 7 is assumed. Groups 1 to 3 in the figure correspond to person position coordinate groups. In the state in which a plurality of people is present such that they overlap each other in the direction in which laser light is radiated, like groups 1 and 2, it is not possible for the laser sensor 5 to individually measure the distances to the people.

However, the person having the highest risk in each group is the person who is closest to the robot arm 2, i.e. the person to whom the distance can be measured using the laser sensor 5. Consequently, the person is regarded as a recognized person, and it is determined whether or not the person position (x, y) of the recognized person in each group and the tag position (x, y) completely overlap each other. In the case shown in FIG. 7, the two completely overlap each other. Consequently, the safety skill level of each recognized person is an expert in group 1, a beginner in group 2, and an expert in group 3, and therefore the level in these groups is recognized as a "beginner."

Figure 8:
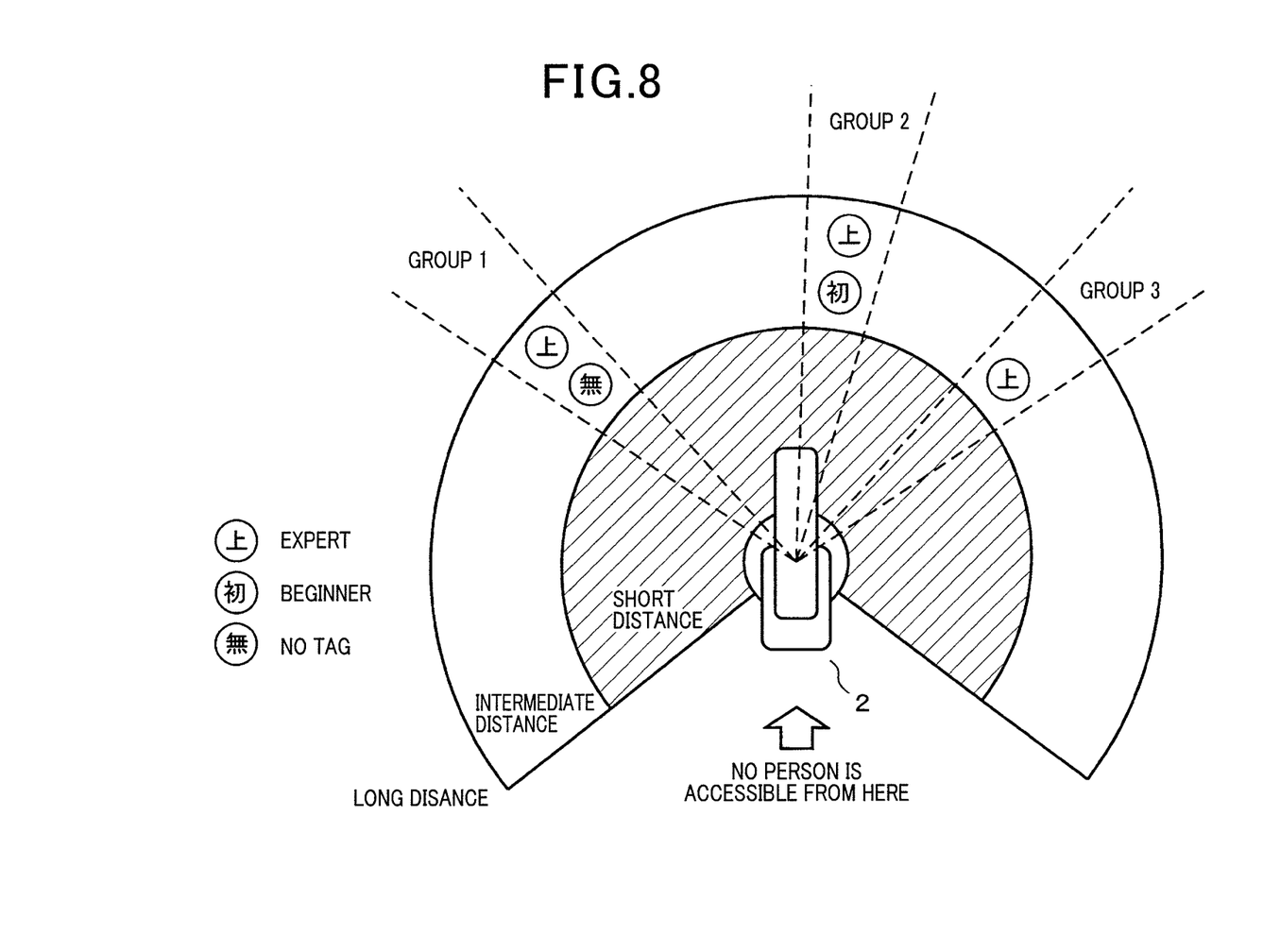
FIG. 8 is a view showing an example of the case in which a plurality of people is present within a range of the intermediate distance (part 2)

In the case shown in FIG. 8, on the other hand, the recognized person in group 1 does not have an RFID tag 15. Consequently, it is not possible to acquire the tag position (x, y), and the person position (x, y) and the tag position (x, y) do not completely overlap each other. This case is recognized as "no tag."

Subsequently, at step S6, it is determined whether or not the recognition result of step S5 is "no tag." In the case in which the recognition result is "no tag" (YES), it is possible to assume that the recognized person is in danger even though the recognized person is present within the intermediate distance, since the safety skill level of the recognized person is below that of a beginner. Consequently, step S9 is performed to stop the operation of the robot arm 2.

On the other hand, in the case in which the recognition result of step S5 is not "no tag," (NO), it is determined whether or not the recognition result is a "beginner" (S7). In the case in which the recognition result is the "beginner" (YES), the robot arm 2 is decelerated such that the robot arm 2 is operated at a "low speed," since the safety skill level is low (S10). Even though the recognized person is the beginner, therefore, the recognized person may check the motion of the robot arm 2 and may have the time to ensure his/her own safety. Here, the "low speed" may be about 250 mm/s, which is prescribed as a safety speed at the time of performing, for example, a teaching operation.

In addition, in the case in which the recognized person is not a "beginner," i.e. is an "expert" (NO of S7), the robot arm 2 is operated at a high speed (S8). In the case in which the recognized person is an expert, who has a high safety skill level, it is possible for the recognized person to rapidly ensure his/her own safety even when the robot arm 2 is operated at a high speed. Consequently, there is no safety issue.

Figure 5:
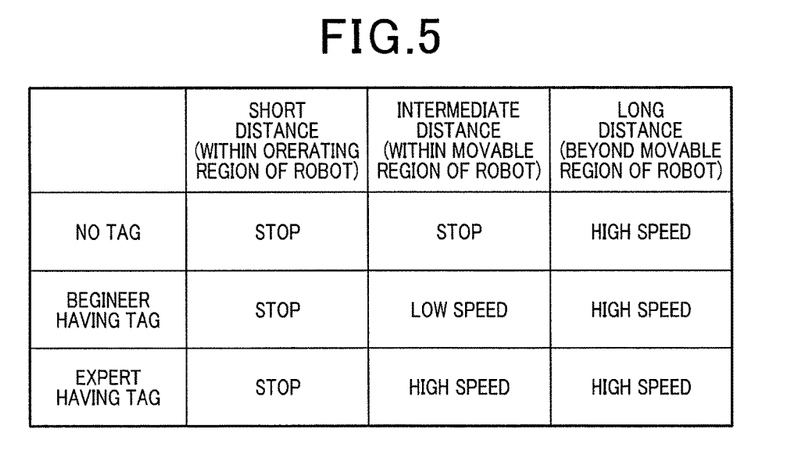
FIG. 5 is a view showing operation states of the robot arm that are determined depending on a short distance, an intermediate distance, a long distance, and the degree of a safety skill level.
Figure 6:
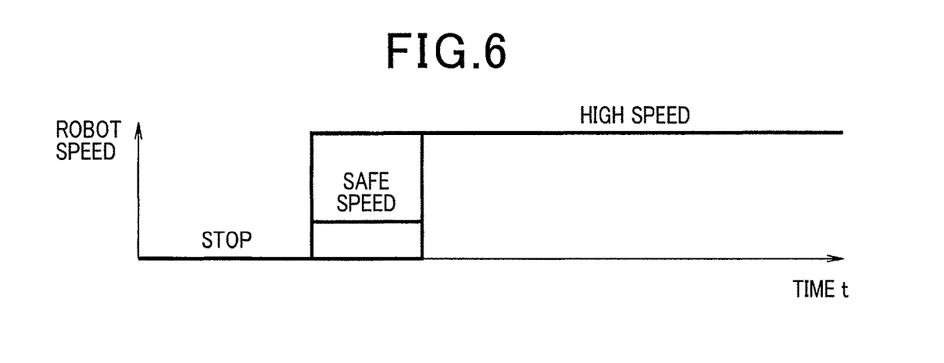
FIG. 6 is a view showing the operating speed of the robot arm, which is indicated by the vertical axis, based on the distance, which is indicated by the horizontal axis.

By the above processing, the operation state of the robot arm 2 in response to whether the distance to the person 14, who is the recognized person, is within the range of the short distance, the intermediate distance, or the long distance, whether the RFID tag 15 is present or absent, and whether the information about the safety skill level is set to a beginner or an expert is set and classified as shown in FIGS. 5 and 6. That is, in the case in which the distance to the person 14 is within the range of the intermediate distance and the RFID tag 15 is absent, the operation of the robot arm 2 is paused. In addition, in the case in which the information about the safety skill level is set to the beginner, the robot arm 2 is operated at a low speed. In the case in which the information about the safety skill level is set to the expert, the robot arm 2 is operated at a high speed.

According to this embodiment as described above, the laser sensor 5 measures the distance from the operating region of the robot arm 2 to the person 14 who is approaching the region. The RFID reader 4 acquires information for acquiring the safety skill level that is stored in the RFID tag 15 attached to the person 14 via a radio wave signal. The robot controller 3 defines the distance within the movable region of the robot arm 2 as a short distance, defines the distance exceeding the movable region of the robot arm 2 as a long distance, and defines the distance between the short distance and the long distance as an intermediate distance. In the case in which the measured distance is within the range of the long distance, the robot arm 2 is operated at a high speed without deceleration. In the case in which the measured distance is within the range of the short distance, the operation of the robot arm 2 is paused. In addition, in the case in which the measured distance is within the range of the intermediate distance and the safety skill level indicates an expert, the robot arm 2 is operated at a high speed. In the case in which the measured distance is within the range of the intermediate distance and the safety skill level indicates a beginner, the robot arm 2 is decelerated and thus operated at a low speed such that the person 14 can take action to ensure his/her own safety. In the case in which the measured distance is within the range of the intermediate distance and the safety skill level cannot be acquired, the operation of the robot arm 2 is paused.

That is, in the case in which the person 14 is detected within the range of the intermediate distance, the operation of the robot arm 2 is paused or the robot arm 2 is operated at a high speed or a low speed depending on whether or not it is possible to acquire the safety skill level of the person 14 or depending on the degree of the acquired safety skill level. Consequently, it is possible to ensure the safety of the person 14 who is present within the range of the intermediate distance and to prevent the operation of the robot arm 2 from being paused or the robot arm 2 from being operated at a low speed in the same way, thereby minimizing the reduction of work efficiency.

In addition, the laser sensor 5 is configured to also acquire the person position (x, y), and the RFID reader 4 is also configured to acquire the tag position (x, y). In the case in which a plurality of person positions (x, y) is acquired within the range of the intermediate distance, the robot controller 3 determines whether or not a plurality of tag positions (x, y) is acquired in response to the person positions (x, y). In the case in which the tag positions (x, y) are acquired in response to the person positions (x, y) and any one of the safety skill levels corresponding thereto indicates a beginner, the robot arm 2 is operated at a low speed. On the other hand, in the case in which no tag positions (x, y) are acquired corresponding to the person positions (x, y), the operation of the robot arm 2 is paused. Consequently, it is possible to ensure safety if the operation state of the robot arm 2 is determined even when a plurality of people 14 is present within the range of the intermediate distance and the distances to and positions of all people 14 cannot be detected.

When a plurality of person positions (x, y) is acquired in a plurality of directions within the range of the intermediate distance, the robot controller 3 regards the person positions present in the respective directions as person position coordinate groups, for example groups 1 to 3, as shown in FIG. 7. In the case in which a tag position (x, y) that does not correspond to the acquired person position (x, y) of at least one of the person position coordinate groups is acquired on the extension line thereof, it is determined whether or not the safety skill level of the acquired person position (x, y) is acquired and whether the safety skill level of the acquired person position (x, y) is high or low. One of groups 1 to 3 having the lowest safety skill level is finally evaluated.

That is, in the case in which the laser sensor 5 is used, when a plurality of people is present such that they overlap each other in the direction in which the laser light is radiated, it is possible to acquire the position coordinate value of the person who is present at a position close to the laser sensor 5. However, if the laser light is radiated to the person who is present at a position distant from the person who is present at a position close to the laser sensor 5, the person position (x, y) may not be detected. In the latter case, however, the tag position (x, y) may be acquired. In this state, the person 14 who is closer to the robot arm 2 is in greater danger. Consequently, it may be determined whether or not the safety skill levels of the acquired person positions (x, y) are acquired and whether the safety skill levels of the acquired person positions (x, y) are high or low. If the operation state of the robot arm 2 is determined by finally evaluating one of groups 1 to 3 having the lowest safety skill level, it is possible to ensure safety through efficient processing.

Second Embodiment

The parts of the second embodiment identical to those of the first embodiment are denoted by the same reference symbols, and a description thereof will be omitted. Hereinafter, the parts of the second embodiment different from those of the first embodiment will be described.

Figure 9:
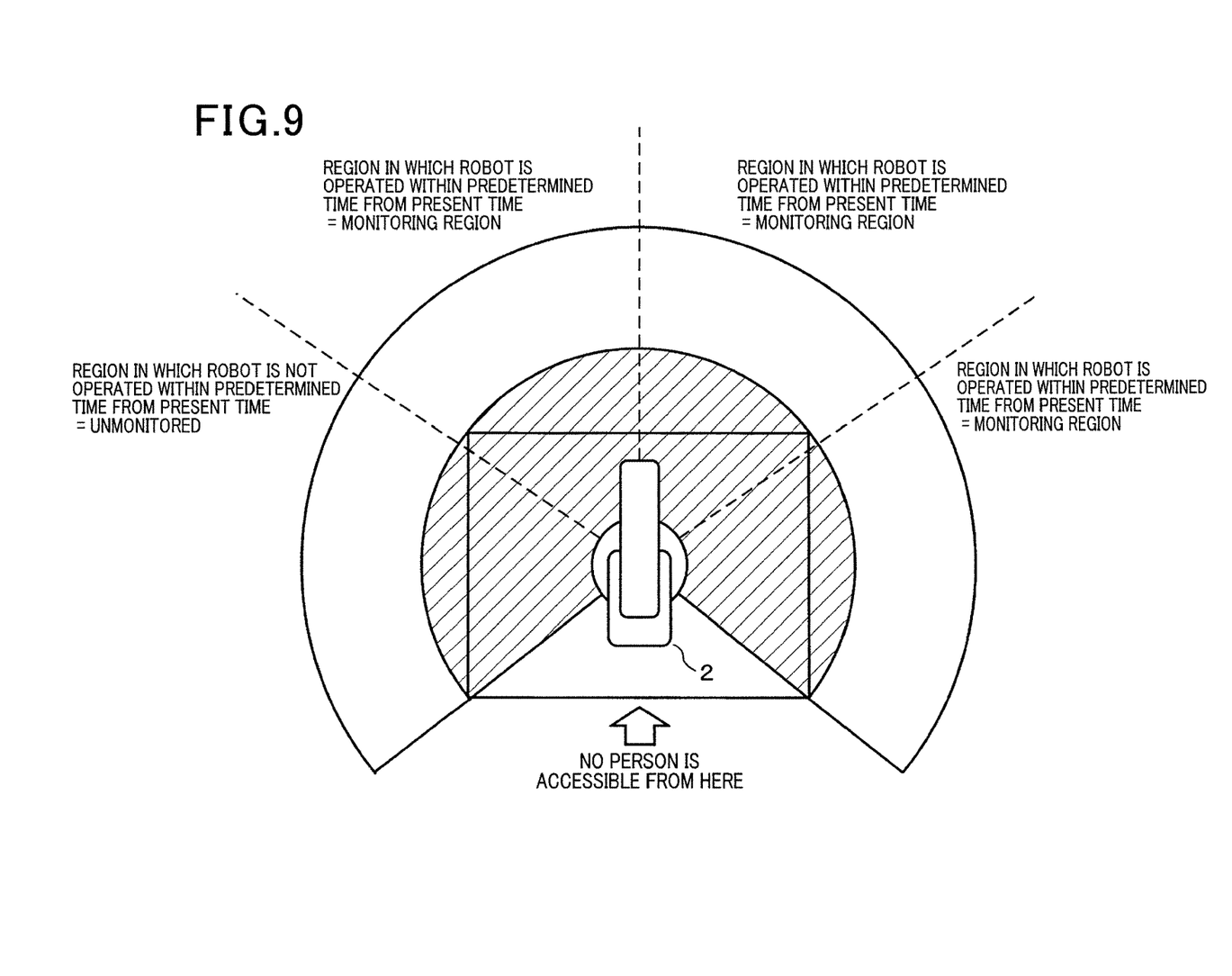
FIG. 9 is a view showing an example in which a movable region of a robot arm according to a second embodiment is divided into a monitoring region and an unmonitored region.

In the second embodiment, as shown in FIG. 9, the movable region of the robot arm 2 is divided into, for example, four regions. The robot arm 2 is operated according to a control program, but the robot safety monitoring unit 13 of the robot controller 3 sets a region that the robot arm 2 is to enter within a predetermined time, for example about 1 second, from a control period at each time as a "monitoring region." In addition, the robot safety monitoring unit 13 of the robot controller 3 sets a region that the robot arm 2 is not to enter within the predetermined time as a "unmonitored region."

Figure 10:
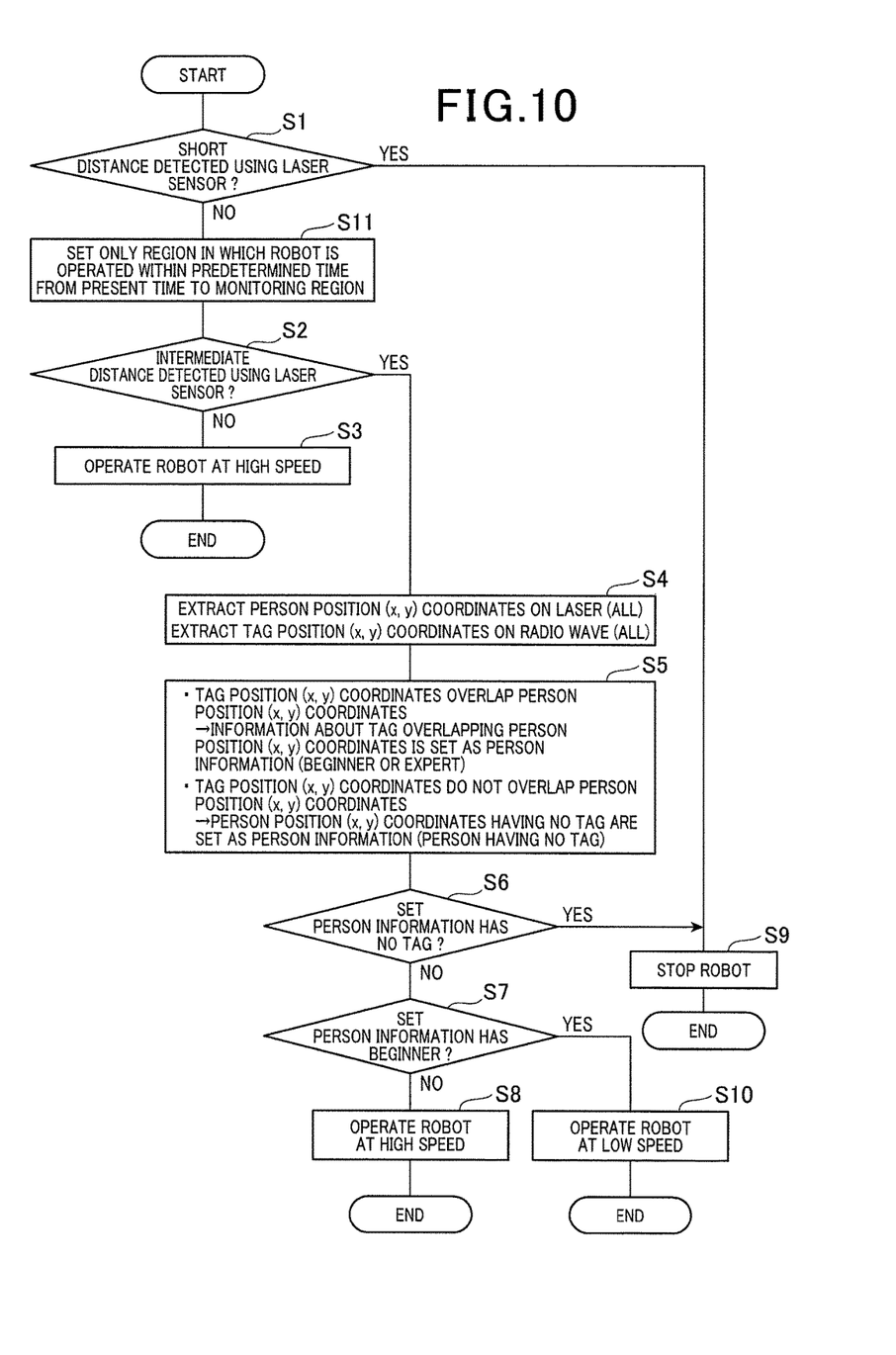
FIG. 10 is a flowchart showing control based on a robot safety monitoring unit of a robot controller.

As shown in FIG. 10, when the determination result at step S1 is "NO," the above setting is performed at step S11. Subsequently, at step S2, a person 14 who is present within the range of the intermediate distance only in the "monitoring region" is detected. In the case in which a person 14 is detected within the range of the intermediate distance in the unmonitored region, therefore, the determination result at step S2 is "NO," and the procedure advances to step S3.

According to the second embodiment as described above, the robot controller 3 defines a region in which the robot arm is to operate within a predetermined time from the present time as a monitoring region and defines a region in which the robot arm is not to operate within the predetermined time from the present time as an unmonitored region. In the case in which the measured distance belongs to the intermediate distance and to the unmonitored region, the robot arm 2 is operated at a high speed without deceleration, since safety is ensured even when a person 14 is present within the range of the intermediate distance. Consequently, it is possible to further improve work efficiency.

Third Embodiment

Figure 11:
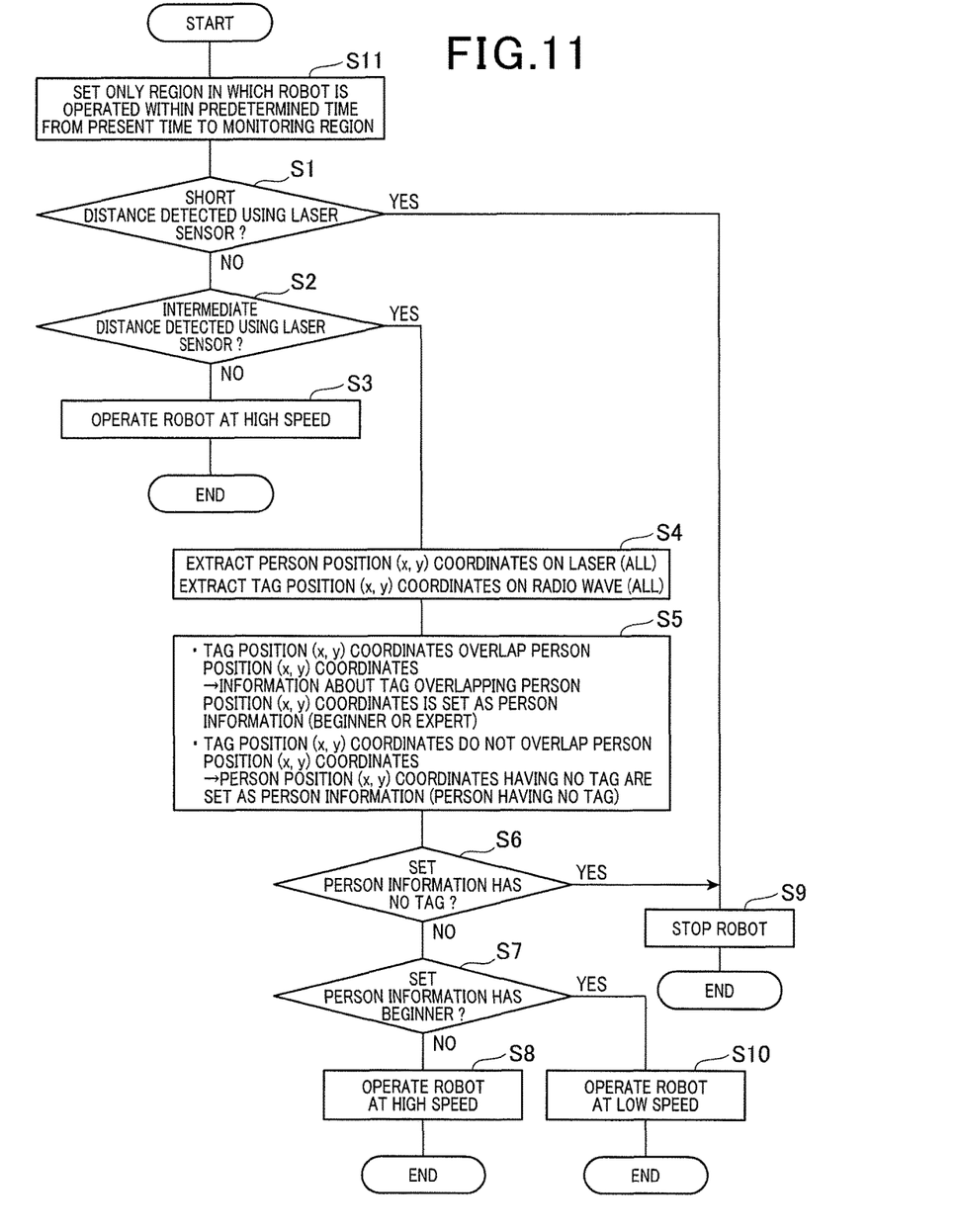
FIG. 11 is a flowchart showing control based on a robot safety monitoring unit of a robot controller according to a third embodiment.

In the third embodiment, as shown in FIG. 11, step S11 is performed before step S1. Subsequently, at step S12, a person 14 who is present within the range of the short distance in only the "monitoring region" is detected. In the case in which a person 14 is detected within the range of the short distance in the unmonitored region, therefore, the determination result at step S1 is "NO," and the procedure advances to step S2. Furthermore, the process at step S2 is the same as that of the second embodiment. That is, if the person is present in the unmonitored region, the robot arm 2 does not enter the unmonitored region within a predetermined time even when the person is present within the range of the short distance. Even in this case, therefore, the process is performed in the same manner as the process in the intermediate distance according to the second embodiment.

According to the third embodiment as described above, the robot controller 3 operates the robot arm 2 at a high speed even in the case in which the measured distance belongs to the short distance and to the unmonitored region. Consequently, it is possible to even further improve work efficiency.

The present invention is not limited to the embodiments described above with reference to the drawings, but may be modified or extended as follows.

The robot main body is not limited to the robot arm 2, but may be, for example, a 4-axis horizontal robot arm, a self-traveling robot, or a human-type robot.

The safety skill level information is not necessarily stored in a recording medium. For example, ID information necessary to identify a person 14 may be stored in the recording medium, and the safety skill level information corresponding to each piece of ID information may be stored in the control device or in an external storage device such that the control device acquires the ID information.

The distance measuring unit and the information acquisition unit may not acquire the person position coordinate value and the medium position coordinate value.

The recording medium is not limited to the RFID tag 15, but may be a medium in which information necessary to acquire the safety skill level of the person is stored, wherein the information may be acquired by a wirelessly transmitted signal.

The distance measuring unit is not limited to the laser sensor 5, but may be any one that is capable of at least measuring the distance from the operating region of the robot main body to a person who is approaching the region.

In the second and third embodiments, the number of divided movable regions and the predetermined time may be appropriately changed based on individual design.

DESCRIPTION OF REFERENCE SYMBOLS

In the drawings, 1 indicates a robot control system, 2 indicates a robot arm, 3 indicates a robot controller, 3B indicates a CPU, 4 indicates an RFID reader, 5 indicates a laser sensor, 11 indicates a safe distance monitoring unit, 12 indicates an intermediate distance tag information monitoring unit, 13 indicates a robot safety monitoring unit, 14 indicates a person, and 15 indicates an RFID tag.

What is claimed is:

1. A robot control system comprising:
 a distance measuring unit configured to measure a distance from an operating region of a robot main body to a person who is approaching the region;
 an information acquisition unit configured to acquire, by a wirelessly transmitted signal, information necessary to acquire a safety skill level of the person, which is stored in a recording medium possessed by the person; and
 a control device configured to control operation of the robot main body and acquiring the distance and the information from the distance measuring unit and the information acquisition unit, wherein
 the control device is configured to classify the distance into a short distance, which is a distance within the operating region, a long distance, which is a distance that exceeds a movable region of the robot main body, and an intermediate distance, which is a distance between the short distance and the long distance,
 in a case in which the distance belongs to the long distance, the control device operates the robot main body without deceleration,
 in a case in which the distance belongs to the short distance, the control device stops the operation of the robot main body,
 in a case in which the distance belongs to the intermediate distance and the safety skill level indicates an expert, the control device operates the robot main body without deceleration,
 in a case in which the distance belongs to the intermediate distance and the safety skill level indicates a beginner, the control device operates the robot main body in a decelerated state such that the person takes action to ensure their own safety, and
 in a case in which the distance belongs to the intermediate distance and the safety skill level is not acquired, the control device stops the operation of the robot main body.

2. The robot control system according to claim 1, wherein
 the distance measuring unit is configured to acquire a person position coordinate value, which is a position of the person to whom the distance is measured,
 the information acquisition unit is configured to acquire a medium position coordinate value, which is a position of the recording medium,
 in a case in which a plurality of person position coordinate values is acquired within a range of the intermediate distance, the control device is configured to determine whether or not a plurality of medium position coordinate values corresponding to the person position coordinate values is acquired,
 in a case in which the medium position coordinate values corresponding to the person position coordinate values are acquired and any one of the safety skill levels corresponding to the medium position coordinate values indicates the beginner, the control device is configured to operate the robot main body in the decelerated state, and
 in a case in which no medium position coordinate values corresponding to the person position coordinate values are acquired, the control device is configured to stop the operation of the robot main body.

3. The robot control system according to claim 2, wherein
 the distance measuring unit is constituted by a laser sensor,
 when a plurality of person position coordinate values is acquired in a plurality of directions within the range of the intermediate distance, the control device is configured to regard the person position coordinate values present in the respective directions as person position coordinate groups,
 in a case in which a medium position coordinate value that does not correspond to the acquired person position coordinate value of at least one of the person position coordinate groups is acquired on an extension line thereof, the control device is configured to determine whether or not the safety skill level of only the acquired person position coordinate value is acquired and whether the safety skill level of the acquired person position coordinate value is high or low and evaluate the safety skill level of the person position coordinate group, and
 the control device is configured to finally evaluate one of the person position coordinate groups that has a lowest safety skill level.

4. The robot control system according to claim 3, wherein
 the control device is configured to define a region in which the robot main body is to operate within a predetermined time from a present time as a monitoring region and define a region in which the robot main body is not to operate within the predetermined time from the present time as an unmonitored region, and
 in a case in which the distance belongs to the intermediate distance and to the unmonitored region, the control device is configured to operate the robot main body without deceleration.

5. The robot control system according to claim 4, wherein, even in a case in which the distance belongs to the short distance and to the unmonitored region, the control device is configured to operate the robot main body without deceleration.

6. The robot control system according to claim 1, wherein
 the control device is configured to define a region in which the robot main body is to operate within a predetermined time from a present time as a monitoring region and define a region in which the robot main body is not to operate within the predetermined time from the present time as an unmonitored region, and in a case in which the distance belongs to the intermediate distance and to the unmonitored region, the control device is configured to operate the robot main body without deceleration.

7. The robot control system according to claim 6, wherein, even in a case in which the distance belongs to the short distance and to the unmonitored region, the control device is configured to operate the robot main body without deceleration.

8. The robot control system according to claim 2, wherein
the control device is configured to define a region in which the robot main body is to operate within a predetermined time from a present time as a monitoring region and define a region in which the robot main body is not to operate within the predetermined time from the present time as an unmonitored region, and in a case in which the distance belongs to the intermediate distance and to the unmonitored region, the control device is configured to operate the robot main body without deceleration.

9. The robot control system according to claim 8, wherein, even in a case in which the distance belongs to the short distance and to the unmonitored region, the control device is configured to operate the robot main body without deceleration.

* * * * *